United States Patent Office 3,579,377
Patented May 18, 1971

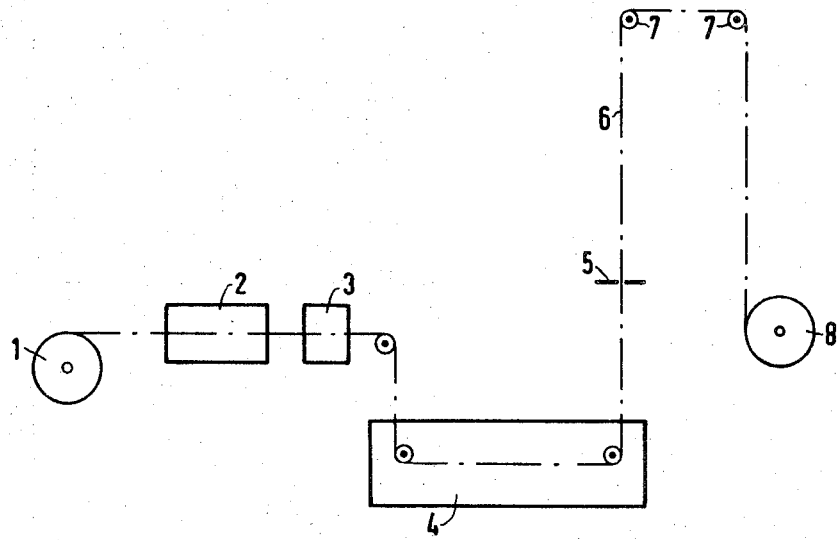
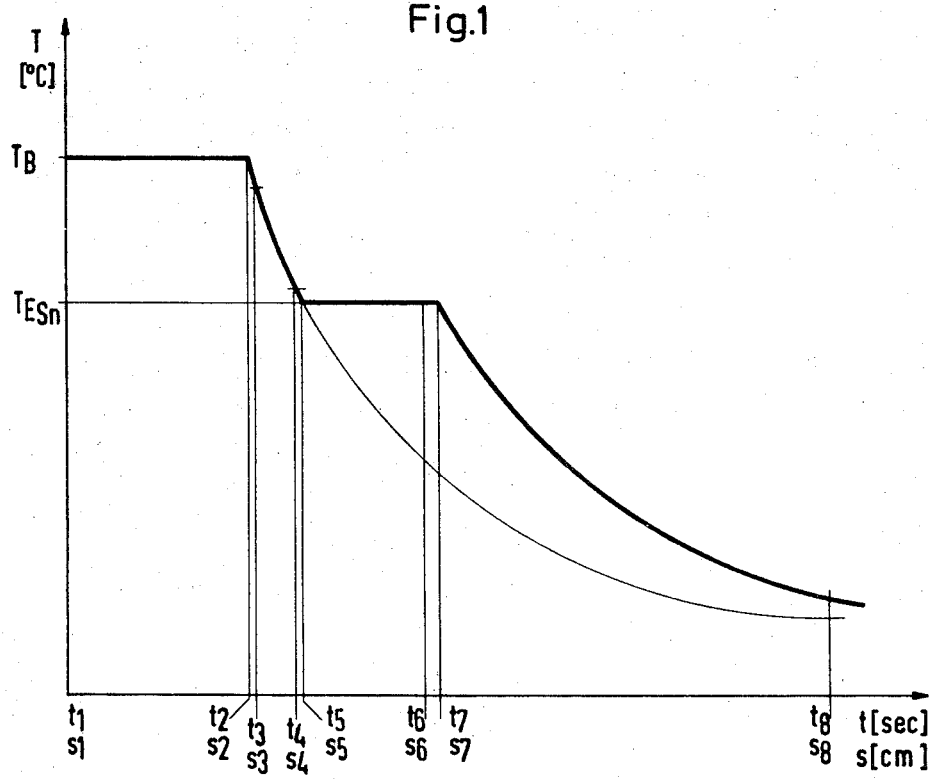

3,579,377
METHOD OF PRODUCING TIN OR TIN-ALLOY COATED COPPER JUMP WIRE BY MEANS OF HOT METALIZING
Horst Schreiner, Nuremberg, and Helmut Ohmann, Erlangen, Germany, assignors to Siemens Aktiengesellschaft, Berlin and Munich, Germany
Filed Apr. 25, 1968, Ser. No. 724,012
Claims priority, application Germany, Apr. 29, 1967, S 109,665
Int. Cl. B44d 1/44; C23c 1/04
U.S. Cl. 117—217
7 Claims

ABSTRACT OF THE DISCLOSURE

Described is a method of producing copper wire, uniformly coated around its periphery with tin or a predominantly tin-containing alloy, by hot metalizing. In this method a scraping die is placed at such a distance from the surface of the bath of tin or a predominantly tin-containing alloy, that the scraping die is positioned just within the solidification range of the bath component.

---

Figure 3:
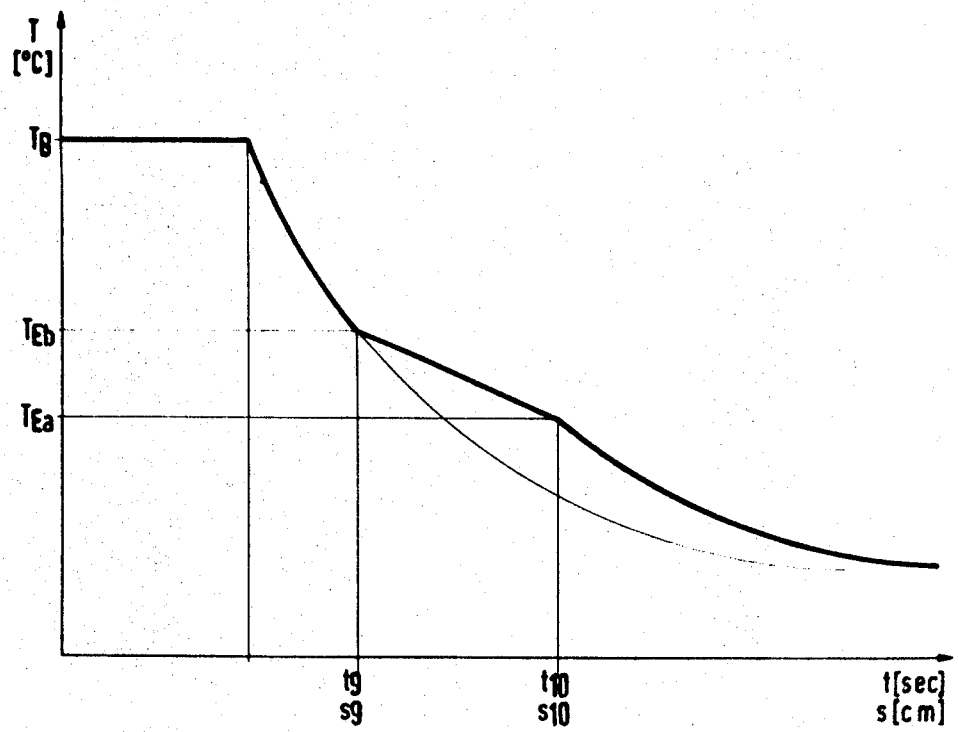

In the known methods used for hot metalizing, particularly hot tin plating of copper jump wires, the annealed, reduced and etched wire is passed through a tin bath and the excess tin is removed in a circular scraper die. Various other ways have been suggested to obtain a uniform layer thickness, primarily of pure tin, across the wire periphery. An adequate tin layer thickness of $5\pm2\mu m$ is necessary for satisfactory solderability. In previous methods of hot tin plating, an homogeneous tin layer across the wire could not be ensured for wires with a circular cross section or when a circular scraping die was used. The so-called half-moon effect would occur. Thus, there was no shortage of suggestions to obviate these shortcomings. Among others, it had suggested to use profiled copper wires, or profiled scraping dies. This technique has the disadvantage that the forming, or the profiling scraping die must be produced within very narrow tolerances. This is quite difficult. The necessary tool life is very short.

We have realized that a disadvantage of the commonly used methods which employ a scraping die of circular cross section is that the nozzle is arranged at such a small distance from the bath surface that the tin, or the tin-containing alloy deposited on the wire remains liquid for some time upon the wire, running through the die, after having left the die. This liquid tin does not exert a directive force upon the copper wire in the die. The wire lies alternately, at various places of the die walls. Thus, the coating, especially the tin, is almost completely stripped away at these places. The result is a tin layer with a half-moon cross section. The travel of the wire in the die also changes the position of the thickest point of the half-moon with respect to the cross section of the wire. If, after passing through the scraping die, the tin remains liquid for too long a time, it may begin to collect at a location of the periphery, thus making the half-moon shaped tin layer even more irregular.

We have discovered that copper wire having a uniform peripheral layer of tin, or of a primarily tin-containing alloy, may be produced by hot metalizing if the position of the scraping die or nozzle is adjusted to the solidification process of the bath component. In accordance with the present invention, the scarping die is at such a distance from the surface of the bath of tin or predominantly tin-containing alloy, that said scraping die is positioned just inside the solidification region of the bath component. The copper wire which is usually of circular cross section may have a smooth surface, although in some instances it may be preferable to use a wire whose surface is provided with grooves. The scraping die may be of circular or polygonal cross section. The solidification process requires a finite time. Within the solidification range of the tin, the tin crystal seeds or tin crystallites which form, within the melt exert directive forces, center the wire in the scraping die. Solidification ends immediately beyond the nozzle, so that the tin layer does not undergo any changes thereafter. On the other hand, the tin layer can still be formed or shaped with small forces which are well below the stability of the wire, so that there is no danger of tearing the wire in the die.

In performing the method of the present invention, it is preferable to work at a constant die temperature $T_D$, which is preferably about 200° C. Particularly good results were obtained during tin plating of a copper wire, at a tin bath temperature $T_B$ of 270° C. and a wire velocity V of approximately 100 cm./seconds with the distance of the nozzle from the surface of the tin bath being 800 to 1000 mm.

Figure 4:
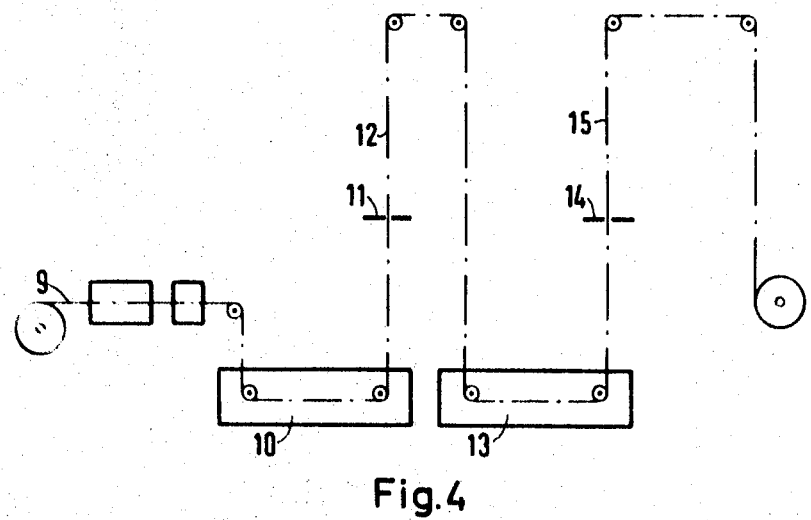

In the drawing, FIGS. 1 and 4 each show schematically wire plating installations; and
FIGS. 2 and 3 are explanatory graphs.
The invention will be illustrated in greater detail on hand with the drawing, wherein:

FIG. 1 shows schematically a wire tin plating installation. The copper wire starts from coil 1 and runs through the steam annealling device 2, the etching bath 3 into the tin bath 4. The emerging tinned copper wire runs through the scraping die 5, the cooling zone 6 and is then wound up upon windup roll 8, via the guide roller 7. Roll 8 is driven and pulls the wire through the entire installation at a predetermined speed. The travel speed is approximately 100 cm./sec.

FIG. 2 shows the temperature distribution of the tin upon the copper wire. The ordinate shows the temperature and the abscissa shows the time. Since the speed of the wire is constant (e.g., 1 m./sec.), the path which is proportional to time, is plotted. The wire traveling through the tin bath assures the temperature of the tin bath $T_B$ and passes through the bath, along the path from $s_1$ to $s_2$. The wire which emerges at $s_2$ is cooled by the surrounding air, during its further travel from $s_2$ to $s_8$, according to an exponential function.

Because of the latent heat, which is released during crystallization, a solidifying metal produces a pause or critical interval during the phase transition from liquid to solid, while the temperature of the metal $T_{E_{Sn}}$ remains constant. In the figure the critical intervals are indicated as $t_5$, $t_7$, or $s_5$, $s_7$. The solidification of the tin begins at $s_5$ due to seed formation and crystal growth and ends at $s_7$. During this period, between $t_5$ and $t_7$, crystals and molten material are both present.

Previously, the circular scraping die of hot tin plating installations, which operated with such circular scraping nozzles, was arranged at such a distance from the tin bath surface, that it was ahead of or prior to the start of solidification, i.e., between $t_3$ and $t_4$. If, on the other hand, in accordance with the present invention, the nozzle is arranged with $t_5$–$t_7$, i.e., between $t_5$ and $t_6$, the tin crystal seeds or in crystallites exert a directive force in the tin melt, which centers the wire in the round scraping die. The solidification ends immediately behind the die, so that the tin layer does not change thereafter. The wire may tear in the die, if at a greater distance from the bath surface, e.g., $s_8$. Therefore, the die is arranged somewhat closer to the bath surface than $s_7$, for example at $s_6$.

The effective parameters are the bath temperature $T_B$, wire velocity V (cm./sec.), die distance $s$ from the bath surface, i.e., from $s_5$–$s_2$ to $s_6$–$s_2$ and the die temperature $T_D$. The die is electrically heated to keep its temperature $T_D$ constant. The solidification process, starting with seed formation, i.e., from the time solidification temperature $T_{ESn}$ is reached, to complete solidification $t_6$, requires a finite period ($t_7$–$t_5$). During this period, the wire travels a finite path, according to speed V, said path being dependent upon the wire thickness, the thickness of the tin layer and the speed of the heat removal by surrounding temperature. Most of all it depends upon the windup or withdrawal speed of the wire. At a wire speed of 100 cm./sec. which is common in hot tin plating and a die length of 0.5 mm., the travel time of the wire through the nozzles is ~0.5 ms. In industrial hot tin-plating, the solidification period from $t_5$–$t_7$ amounts to several hundred ms. The conditions for performing the method of the present invention may vary within an indicated range.

The method of the present invention may also be used for multilayer tin plating. The wire to be coated may pass through the same tin bath a second time. According to a particularly preferred embodiment for obtained two-layer, differently composed coatings, the copper wire first passes through a first tin bath. The wire, after emerging from the tin bath and passing a scraping die arranged in accordance with the present invention and after traveling the cooling path, enters a second tin bath. After emerging from the second scraping die, also arranged in accordance with the present invention, and passing along a cooling path, the wire is wound up.

The present method may also be employed when the copper wire is coated with a tin alloy instead of pure tin such as a SnPb alloy 60/40 which is particularly suitable.

Since the alloys shown in FIG. 3 do not solidify at a constant temperature but rather at a temperature interval between the solidification beginning $T_{Eb}$ and the solidification ending $T_{Ea}$, the melt and the crystals remain together along the continuous wire for a long time between $t_9$ and $t_{10}$, and thereby over the longer path of $s_9$ to $s_{10}$, as contrasted to pure metal. Hence, there is additional play for arranging the die, within $s_9$ and $s_{10}$. For example, when using an SnPb alloy of composition 60/40 as a coating metal, the scraping nozzle may be arranged between 500 and 1200 mm. above the bath level.

A multilayer metal coating may also be applied, according to the aforedescribed methods, by passing sequentially the copper wire through several baths of metal melts, comprised of tin and tin alloys.

A preferred embodiment of the present invention is illustrated in FIG. 4. Wire 9 is first passed through a bath of pure tin 10. After leaving this tin bath the wire passes, in accordance with the present invention, through a scraping die 11 and the cooling zone 12. The wire, which is coated with pure tin, then enters a second bath 13, which consists of an SnPb alloy, for example SnPb 60/40 or tin with a supplement of one or more of the metals Sb, Bi, Zn, Cd. After emerging from the second bath the wire passes, according to the present invention, through a second scraping die 14 and through the cooling zone 15.

Our method is particularly suited for producing thick hot tin plated copper jump wires, which may be used both as raw wires and as insulated wires. They are most useful wherever automatic soldering devices are used, such as flood and dip soldering. Using these same automatic soldering processes, with conventionally made hot tin plated wire, repeated disturbances occur because of irregular and inadequate application of tin.

The invention will be further explained by means of the following nonlimitive embodiment examples:

EXAMPLE 1

An annealed and etched wire of pure copper was passed through a tin bath of 270° C., with a wire velocity of 100 cm./sec. The diamond die, which in an electrically heated version was kept at 200° C., was positioned at a distance between 800 and 1000 mm. above the bath surface. The nozzle diameter was 0.513 mm. The wire pull at the winding device was registered at a measuring device was registered at a measuring device and amounted to 500 to 900 p. The thick tin plated wire was metallographically cut at ten different places, was polished, and the thickness of the tin layer was measured. The latter at all points of the wire periphery was 5±2 μm and thus complies with the requisites placed upon the hot tin plated copper jump wire.

The solderability was determined by the solder ball test. The examining conditions were:

Solder ball weight—75 mg. SnPb 40
Testing temperature—235° C.
Solder ball coating—aluminum with a depression of 3 mm.

The clamped wire was dipped into the liquid bead, and the time was measured for the solder droplet to enclose the wire. The solder time needed for wire when freshly tinned, according to our invention, was 0.5 sec. on the average. Of particular interest is the solder condition following an aging heat treatment up to four days, at 155° C. in the air. Even after this accelerated aging for four days in the air at 155° C., the solder periods for 95% of the measured values were below one second and for 100% of measured values, below 2 sec. This represents an excellent test result. On comparison, for wires which were tin plated in accordance with the known method, and aged by four-day storage in air, at 155° C., 100% of the measured values were more than 6 sec. solder time and thus were unsuitable for difficult soldering operations.

EXAMPLE 2

The annealed and etched copper wire, having a diameter of 0.5 mm. was passed at a velocity of 100 cm./sec. through a first bath of pure tin, which has a temperature of 270° C. A diamond die of 0.513 mm. in diameter which in an electrically heated embodiment was maintained at 200° C., was positioned at a distance of 800 mm. above the bath surface. After the wire has passed through the scraping die, it is cooled along a cooling path and then enters a bath comprised of an SnPb alloy 60/40 which has a temperature of 230° C. The scraping die, heated to 200° C. was 1000 mm. above the bath surface. After passing the nozzle, the wire was cooled and wound.

The wire thus produced had an approximately 2–3 μm thick tin layer, superimposed by a 5–7 μm thick SnPb layer. After a four day storage again at 155° C., the wire was found to be excellently suitable for soldering as the solder times determined with the solder ball test were below 1 second in 100% of the measured values.

We claim:

1. The method of producing copper wire uniformly coated around its periphery with a metal from the group consisting of tin and a predominantly tin-containing alloy, by means of hot metalizing, which comprises positioning the scraping die at such a distance from the surface of a metal bath, that said scraping die is just within the solidification range of the bath component.

2. The method of claim 1, wherein an SnPb alloy 60/40 is used.

3. The method of claim 2, wherein the die is about 50 to 120 cm. from the bath surface, the die is at a temperature of 180 to 220° C., the bath is at a temperature $T_B$ of 200 to 300° C. and the wire velocity is approximately 100 cm./sec.

4. The method of claim 3, wherein a scraping nozzle of circular cross section is used.

5. The method of claim 3, wherein a scraping nozzle of polygonal cross section is used.

6. The method of claim 5, wherein the wire, after passing through a tin bath, the scraping die and a cooling zone, enters a bath comprised of a predominantly tin-containing alloy, whose melting temperature is lower than that of the tin bath.

7. The method of claim 6, wherein the tin bath is at 270° C. and the tin-containing alloy bath is at 230° C.

References Cited

UNITED STATES PATENTS

| 131,680 | 9/1872 | Hill | 117—128 |
| 1,558,035 | 10/1925 | Millring | 117—114 |
| 1,981,130 | 11/1934 | Underwood | 117—102 |
| 3,066,041 | 11/1962 | Busch | 117—114X |
| 3,203,826 | 8/1965 | Stobierski | 117—115X |
| 3,284,892 | 11/1966 | Wade | 117—114X |
| 3,385,259 | 5/1968 | Orban et al. | 118—125X |

ALFRED L. LEAVITT, Primary Examiner

A. GRIMALDI, Assistant Examiner

U.S. Cl. X.R.

117—71, 102, 114, 115, 128, 231, 227